United States Patent [19]
Yamashita

[11] Patent Number: 5,590,636
[45] Date of Patent: Jan. 7, 1997

[54] VEHICLE SLIP CONTROL SYSTEM

[75] Inventor: Tetsuhiro Yamashita, Hiroshima, Japan

[73] Assignee: Mazda Motor Corporation, Hiroshima-ken, Japan

[21] Appl. No.: 113,693

[22] Filed: Aug. 31, 1993

[30] Foreign Application Priority Data

Sep. 1, 1992 [JP] Japan ..................... 4-233897
Sep. 1, 1992 [JP] Japan ..................... 4-233898

[51] Int. Cl.$^6$ ................... F02D 23/00; B60K 31/00
[52] U.S. Cl. ............................. 123/564; 180/197
[58] Field of Search ............... 60/600–603; 123/564; 180/197

[56] References Cited

U.S. PATENT DOCUMENTS 4,432,430  2/1984  Lind et al. ................. 180/197
4,620,420  11/1986  Gloss et al. ................ 60/602

FOREIGN PATENT DOCUMENTS 61-157728  7/1986  Japan.
61-178525  8/1986  Japan.
2-61339    3/1990  Japan.
4325325   11/1992  Japan.
2100886    1/1983  United Kingdom.

Primary Examiner—Michael Koczo
Attorney, Agent, or Firm—Keck, Mahin & Cate

[57] ABSTRACT

A slip control system includes a supercharging pressure control valve for controlling a supercharging pressure produced by a supercharger, a rotation speed detector for detecting a rotation speed of a drive wheel, a slip detector for detecting a slip amount of the drive wheel based on the rotation speed of the drive wheel, a supercharging condition detector for detecting a supercharging condition and a non-supercharging condition, and an engine output restrictor for restricting an engine output by utilizing at least one of the supercharging pressure control device and an engine control valve to reduce the slip amount of the drive wheel when the slip amount of the drive wheel exceeds a predetermined threshold value. The engine output restrictor controls the supercharging pressure by the supercharging pressure control valve in the supercharging condition when the slip amount of the drive wheel exceeds the predetermined threshold value. Further, the engine output restrictor controls the engine output with the engine control device in the non-supercharging condition when the slip amount of the drive wheel exceeds the predetermined threshold value. In the supercharging condition, the engine control, such as a retard control of the ignition timing and a fuel cut control, is restricted so that an undesirable increase in the catalyst temperature can be prevented.

14 Claims, 8 Drawing Sheets

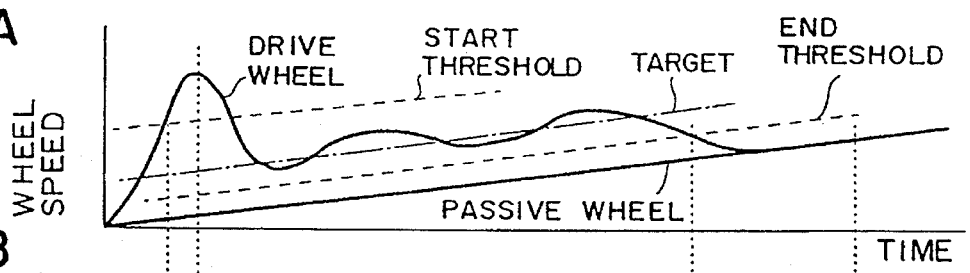
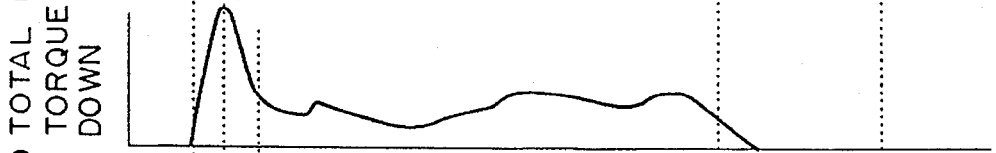
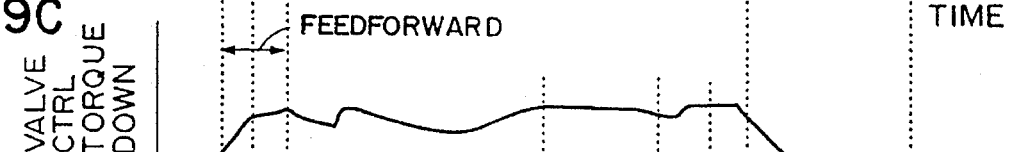
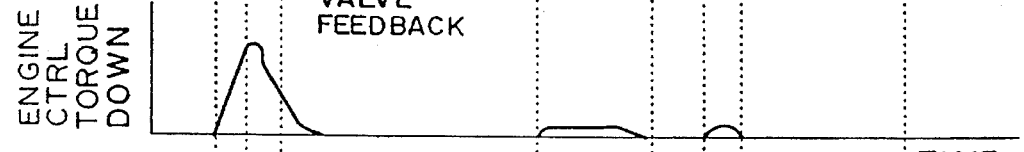
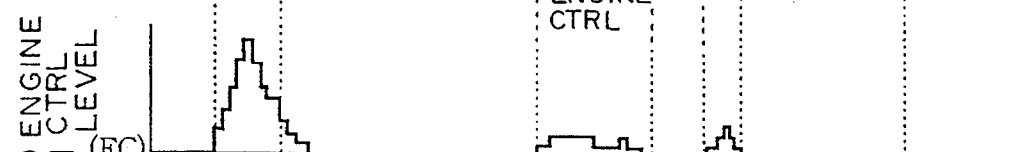
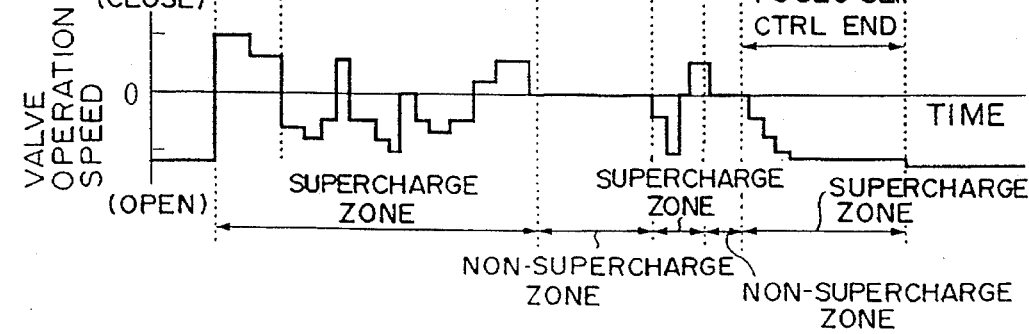

VEHICLE SLIP CONTROL SYSTEM

BACKGROUND OF THE INVENTION

1. Field of the Invention

The present invention relates to a slip control system for a vehicle and, particularly, to a slip control system for a vehicle with a mechanical supercharger of which supercharging pressure is controlled by a supercharging pressure control valve.

2. Description of Related Art

Where a slip of a drive wheel of the vehicle takes place when the vehicle starts running and when the vehicle is in an accelerating condition, a grip force between a tire and road surface is reduced so as to cause various problems such as running instability, deterioration of fuel consumption efficiency and the like. In a vehicle with a supercharger, the engine output torque is enhanced by the supercharger so that the slip condition of the drive wheel tends to cause a reduction in traction efficiency of the driving force.

Conventionally, there have been proposed various slip control systems such as that disclosed in Japanese Patent Public Disclosure No. 2-61339, laid open to the public in 1990. According to this Japanese publication, a change of the engine output torque is calculated based on the engine speed and the throttle valve opening to control the amount of the restriction of the engine output torque in accordance with the slip amount of the drive wheel. There are provided control value calculation means for calculating a control value of the throttle opening, based on the amount of the change of the engine output torque and the slip amount of the drive wheel, and switch means for switching calculating characteristics of the control value, by the control value calculation means, in accordance with operation of the supercharger. This is done to match the control value of the throttle opening with the engine output torque which is changed corresponding to the operation of the supercharger. As a result, even where the engine output characteristics are changed in accordance with the operating condition of the supercharger, the engine output torque can be controlled with good response to the slip of the drive wheel so as to cause an actual rotation speed of the drive wheel to converge with a target value thereof quickly.

In the above slip control device disclosed in the Japanese publication, the restriction control of the engine output torque is made by reducing the opening of the sub-throttle valve disposed in the vicinity of and in series with a main throttle valve.

Other than the above type of slip control system, in which the engine output torque is controlled by the throttle valve opening, there has also been known a slip control system in which the engine control is made through an ignition timing control and/or fuel injection control (a fuel cut) to restrict the engine output torque and thereby reduce the slip amount of the drive wheel. In this type of slip control, a retard value of the ignition timing is determined in view of a control level of the slip value. Alternatively, fuel injection for a specific cylinder is cut in view of the slip control level to reduce the engine output.

It has been proposed to apply the above type of slip control system to a vehicle having an engine with the supercharger so as to restrict the engine output torque.

It should be noted, however, that when the ignition timing is retarded for reducing the engine output in the supercharging condition of the engine, so called delayed combustion takes place due to the large amount of the intake air introduced into the combustion chamber. Delayed combustion undesirably causes an increase in the temperature of the catalyst. Likewise, when the fuel cut is made to restrict the amount of fuel injection, the temperature of the catalyst is also increased so as to damage the catalyst. Further, when the supercharger is effected, or in a supercharging condition, the engine output is abruptly increased so that an initial spin of the wheel or first slip of the wheel, in which a slip amount exceeds a certain level, where the traction control is desired, for the first time during vehicle running, is large as compared with that under a condition where the supercharger is out of operation, or in a non-supercharging condition. Under such a supercharging condition, it is necessary to reduce the slip value as soon as possible.

SUMMARY OF THE INVENTION

It is therefore an object of the present invention to provide a slip control system which can reduce the slip of the wheel quickly and reliably to accomplish traction control.

It is another object of the present invention to suppress an undesirable increase in the catalyst temperature.

The above and other objects of the present invention can be accomplished by a slip control system including a supercharging pressure control valve for controlling a supercharging pressure produced by a supercharger, rotation speed detecting means for detecting a rotation speed of a drive wheel, slip detecting means for detecting a slip amount of the drive wheel based on the rotation speed of the drive wheel, supercharging condition detecting means for detecting a supercharging condition and a non-supercharging condition, and engine output restriction means for restricting an engine output by utilizing at least one of the supercharging pressure control device and an engine control device to reduce the slip amount of the drive wheel when the slip amount of the drive wheel exceeds a predetermined threshold value. The engine output restriction means controls the supercharging pressure by the supercharging pressure control device in the supercharging zone when the slip amount of the drive wheel exceeds the predetermined threshold value. The engine output restriction means controls the engine output by means of the engine control device in the non-supercharging zone when the slip amount of the drive wheel exceeds the predetermined threshold value.

According to the present invention, in the supercharging condition, the engine output restriction means reduces the supercharging pressure by means of the supercharging pressure control device but restricts the engine control, such as ignition timing control or fuel injection control, where the slip amount of the drive wheel exceeds the predetermined slip amount of the drive wheel. In the non-supercharging zone, the engine output restriction means controls the engine control device to restrict the engine output so as to reduce the engine output torque and thus reduce the slip amount of the drive wheel. As aforementioned, the engine control, such as the retard control of the ignition timing and the fuel cut control, is restricted so that the undesirable increase of the catalyst temperature can be prevented. According to the present invention, opening and closing amounts and speeds of the supercharging pressure control valve are controlled in the supercharging condition where the intake pressure, downstream of the supercharger, is greater than the atmospheric pressure. In the non-supercharging condition where the intake pressure is less than the atmospheric pressure, the ignition timing and/or the fuel supply control are made for restricting the engine output. Thus, a desirable slip control can be accomplished without increasing the catalyst temperature.

In another aspect of the present invention, the engine output restriction means includes supercharging pressure control target pressure setting means for setting a supercharging pressure control target slip amount to which engine output is controlled by means of the supercharging pressure control device in the supercharging zone. Engine control target setting means are provided for setting an engine control target slip amount to which the engine output is controlled by means of the engine control. The engine control target slip amount is greater than the supercharging pressure control target slip amount in the supercharging zone and reduced to a predetermined value as an engine operating condition is transferred from the supercharging condition to the non-supercharging condition.

Preferably, the engine control target setting means reduces the engine control target slip amount gradually to the predetermined value as the engine operating condition is transferred from the supercharging condition to the non-supercharging condition to accomplish a smooth slip control.

In another feature of present invention, the engine output restriction means controls both the supercharging pressure control device and the engine control device to reduce the slip amount of the drive wheel at an initial stage of a slip control when a slip condition of the drive wheel takes place. In this case, the engine control target slip amount is set at substantially the same value as the supercharging pressure control target slip amount at an initial stage of a slip control. Then, when an engine operating condition is in the supercharging condition, the engine control target slip amount is gradually increased up to a predetermined value.

In order to reduce the slip amount as quickly as possible, the engine output restriction means controls the supercharging pressure control valve to open at a maximum opening speed by means of a feedforward control at the initial stage of the slip control.

Then, the engine output restriction means finishes the feedforward control when the slip amount of the drive wheel is reduced below a predetermined threshold value.

Alternatively, the engine output restriction means finishes the feedforward control when an intake gas pressure downstream of the supercharger is reduced below a predetermined threshold value. Likewise, the engine output restriction means may finish the feedforward control when a predetermined time period passes after a slip of the drive wheel is detected and necessitates a slip control.

Further objects, features and advantages of the present invention will become apparent from the Detailed Description of Preferred Embodiments which follows when read in light of the accompanying Figures.

BRIEF DESCRIPTION OF THE DRAWINGS

FIG. 9 is a graphical representation of a time chart showing an example of the slip control.

DETAILED DESCRIPTION OF THE PREFERRED EMBODIMENT

Figure 1:
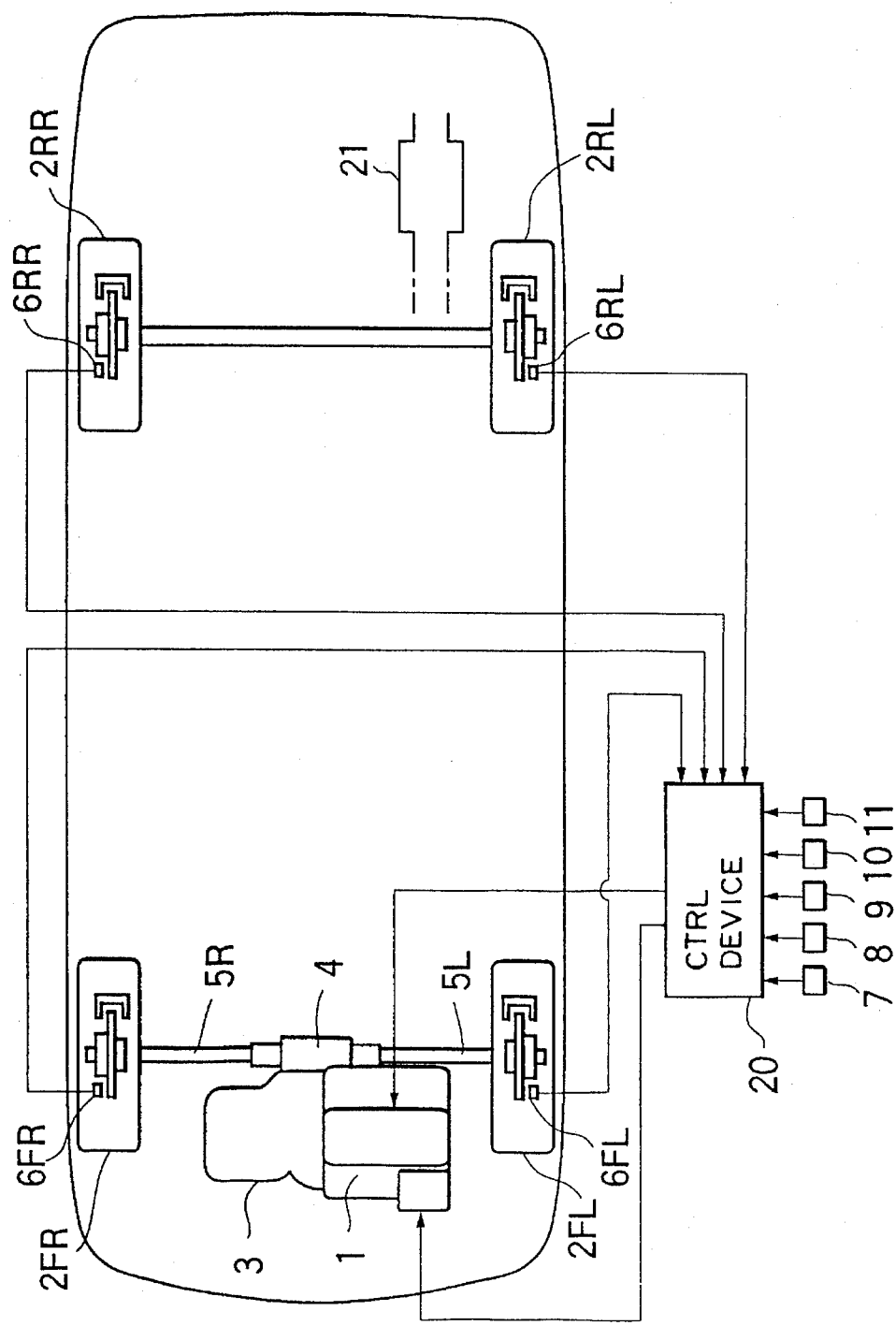
FIG. 1 is a schematic view of a vehicle with a slip control device according to the present invention.

Referring to FIG. 1, the illustrated vehicle is of a front wheel drive type and is provided with front wheels or drive wheels 2FL, 2FR and rear wheels or passive wheels 2RL and 2RR. On the front portion of the vehicle is mounted a six cylinder engine 1 which produces an engine torque for driving the vehicle. The engine torque is transmitted to the right and left front wheels 2FL and 2FR through automatic transmission 3, differential 4 and right and left axles 5R and 5L. The respective wheels 2FL, 2FR, 2RL and 2RR are provided with wheel speed sensors 6FL, 6FR, 6RL and 6RR for detecting respective wheel speeds VFL, VFR, VRL and VRR. The vehicle is also provided with vehicle speed sensor 7 for detecting a vehicle body speed sensor Vr, road friction determining device 8 for determining a road friction coefficient μ, engine speed sensor 9 for detecting engine speed, pressure sensor 10 for detecting an intake pressure downstream of a mechanical supercharger disposed on an intake passage and acceleration sensor 11 for detecting throttle valve movement or acceleration pedal stroke. The vehicle speed sensor 7 adopts as the vehicle speed Vr a smaller value of the wheel speed of the passive wheels 2RL and 2RR. The road friction determining device 8 calculates the friction coefficient μ based on the vehicle body speed Vr obtained through the vehicle speed sensor 7 and acceleration VG of the vehicle body.

There is provided slip control device 20 which controls an actual slip amount of the drive wheels 2FL and 2FR to a target value when the actual slip amount exceeds a predetermined threshold value at which the slip control is initiated. The slip control device 20 receives signals from the wheel speed sensors 6FL, 6FR, 6RL and 6RR, the vehicle speed sensor 7, road friction determining device 8, engine speed sensor 9, pressure sensor 10 and acceleration sensor 11 and produces control signals for ignition timing control, fuel injection control and opening and closing speed control of the supercharging control valve.

Figure 2:
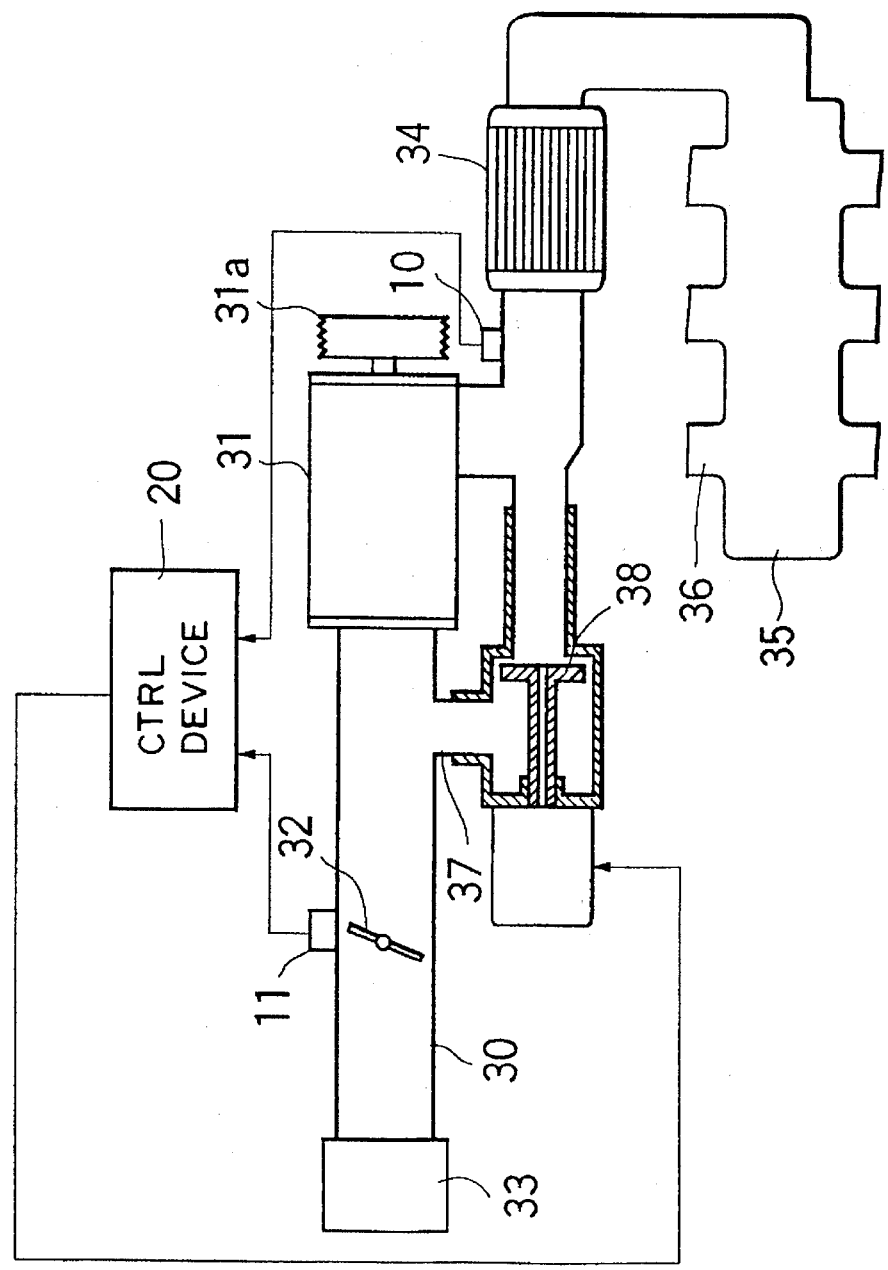
FIG. 2 shows a schematic view of an engine with the slip control device.

There is provided a catalytic converter 21 in an exhaust passage. The supercharger 31 is disposed in the intake passage 30 as shown in FIG. 2. In the illustrated embodiment, the supercharger is a mechanical supercharger which is connected with engine output shaft through a transmitting portion 31a such as pulley and driven by the engine output.

Upstream of the supercharger 31 of the intake passage 30 is disposed a throttle valve 32 having an opening which is controlled by the acceleration pedal. Upstream of the throttle valve 32 is disposed air cleaner 33. Intercooler 34 is disposed downstream of the supercharger 31. Downstream of the intercooler 34 of the intake passage 30 is disposed a surge tank 35. Intake manifold 36 downstream of the surge tank 35 is continued to each of intake ports (not shown) of the cylinder. There is provided a recirculation passage 37 connecting a portion of the intake passage upstream of the supercharger 31 with a portion of the intake passage downstream thereof. Supercharging pressure control valve 38 is disposed in the recirculation passage for controlling the supercharging pressure produced by the supercharger 31. The opening and closing amounts and speeds of the supercharging pressure control valve are controlled by means of duty control. Downstream of the supercharger 31 in the intake passage 30 is disposed pressure sensor 10 for detecting intake gas pressure (boost pressure) downstream of the supercharger 31. Numeral 11 designates an acceleration pedal stroke sensor or throttle sensor for detecting an opening of the throttle valve 32. Numeral 20 designates slip control device 20 to which signals are inputted from the pressure sensor 10 and throttle opening sensor 11 and the like.

Figure 3:
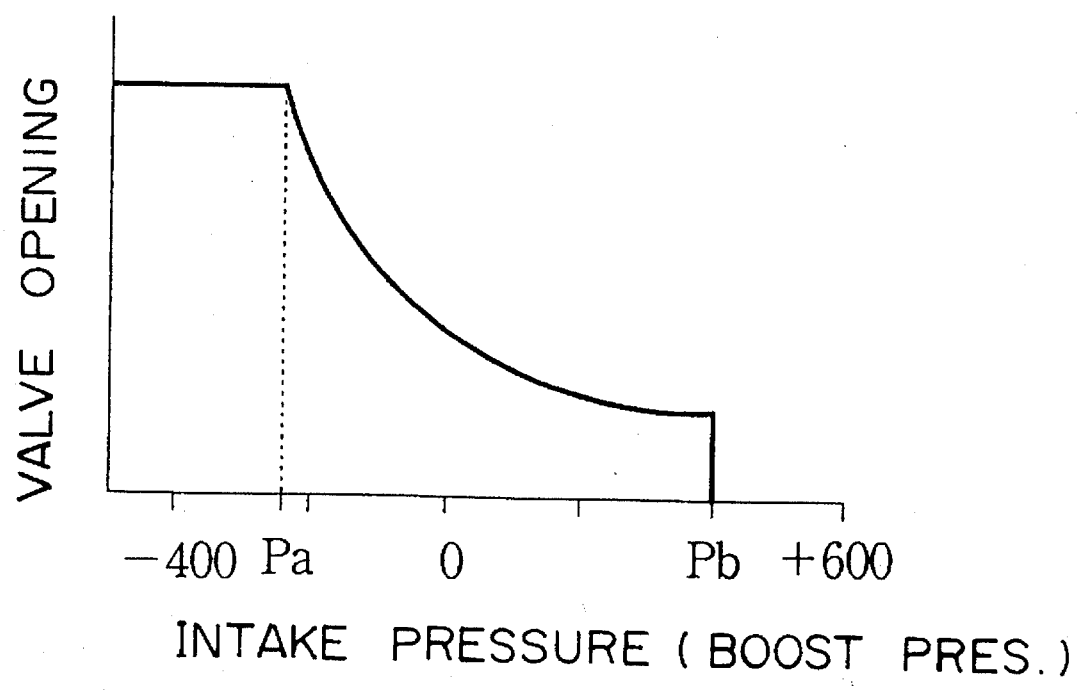
FIG. 3 is a graphical representation of a relationship between the valve opening and the boost pressure.

Referring to FIG. 3, there is shown a relationship between the opening of the supercharging pressure control valve 38 and the intake gas pressure (boost pressure) downstream of the supercharger 31. The opening of the valve 38 is controlled by the slip control device 20 based on the boost pressure detected by the pressure sensor 10. The valve 38 is fully opened in a low engine load condition where the boost pressure is low. The opening of the valve 30 starts reducing when the boost pressure is less than a predetermined value Pa which is lower than the atmospheric pressure. As the boost pressure is increased beyond the atmospheric pressure, the valve 38 is opened to a half level. As the boost pressure is increased far beyond the atmospheric pressure, the valve 38 is nearly closed. When the boost pressure is increased to a predetermined pressure Pb where the engine operating condition is in a high load condition, the valve 38 is fully closed. Where the boost pressure is greater than the atmospheric pressure, the engine is in a supercharging zone where the supercharger 31 is effected to supercharge the intake gas introduced thereinto. On the other hand, where the boost pressure is less than the atmospheric pressure, the engine is in a non-supercharging zone where the supercharger is not effected.

In the low engine load condition where the throttle valve opening is small, the valve 38 is opened so that the intake gas is introduced to the intercooler 34 and the recirculation passage 37 through the supercharger 31. The intake gas passing through the intercooler 34 is introduced into the engine or combustion chamber. On the other hand, the intake gas passing through the recirculation passage 37 flows from downstream of the supercharger 31 to upstream thereof to reduce a pressure difference between the passage portions disposed upstream and downstream of the supercharger 31. This means that the recirculation passage is used to reduce the pressure difference of the intake passage portions disposed upstream and downstream of the supercharger 31.

As the throttle valve 32 is gradually opened, the opening of the supercharging pressure control valve 38 is gradually reduced from the pressure Pa which is smaller than the atmospheric pressure. Thus, an engine output torque is also gradually changed to prevent an abrupt change thereof. Even when the boost pressure is increased beyond the atmospheric pressure to get into the supercharging zone, the control valve 38 is not fully closed until the boost pressure is increased to a certain value. In this condition, the supercharged intake gas is effectively recirculated to reduce an energy loss of the supercharger 31.

When the boost pressure is further increased in the supercharging zone, the control valve 38 is fully closed. As a result, the supercharging effect is enhanced.

Hereinafter, a traction control or slip control is explained in connection with the slip control device.

The slip control device 20 is provided with input interface to which various signals are introduced from sensors, a microcomputer including CPU, ROM and RAM, an output interface, a driving circuit for igniter and fuel injection devices, and another driving circuit for controlling the opening amount and speed of the control valve 38. The ROM stores control programs various maps and tables for providing the slip control. The RAM includes various memories for carrying out the slip control.

Figure 4:
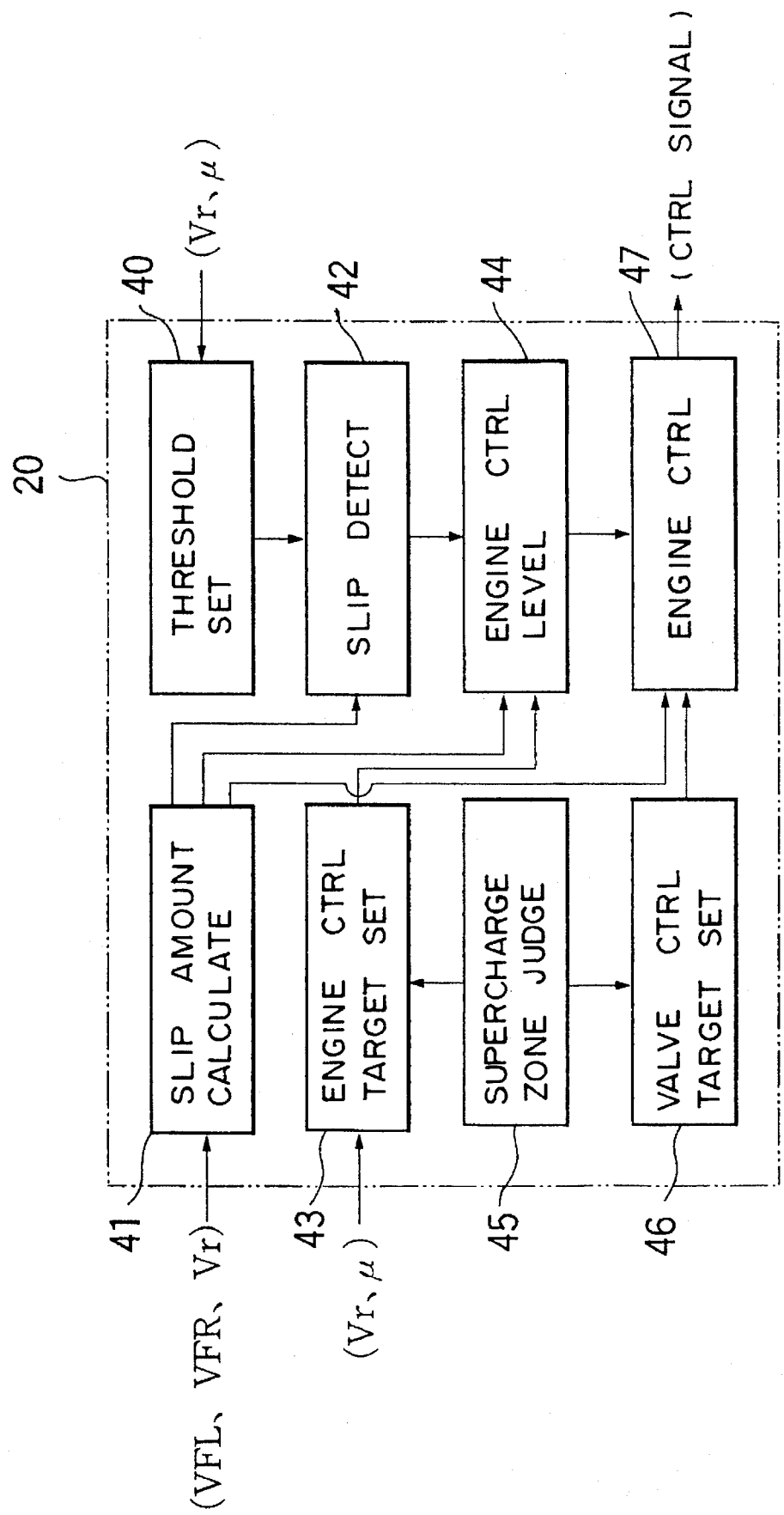
FIG. 4 is a block chart of a slip control device.

As shown in FIG. 4, the slip control device 20 is provided with threshold setting section 40 for setting a threshold value at which the slip control is initiated, slip calculating section 41 for calculating the slip amount of the drive wheel, slip judgment section 42 for judging whether or not the slip amount exceeds the threshold value, engine output control target setting section 43 for setting a target slip amount of the drive wheel for the engine output control engine control level calculating section 44 for calculating a control value for the engine output control, supercharging zone judgment section 45 for judging whether or not the engine operating condition is in the supercharging zone, control valve target setting section 46 for setting a target slip amount of the drive wheel for the opening of the supercharging pressure control valve 38 and engine output control device 47 for controlling the engine output.

(Determination of the threshold value of the slip judgment)

The threshold values, including start and end threshold values, are provided for judging whether or not the slip control should be initiated or terminated. The setting section 40 determines the threshold value in light of a map (not shown) prepared based on the vehicle body speed Vr and road friction coefficient μ.

(Calculation of the slip amount)

The slip amount calculation section 41 calculates the slip amounts SL and SR by subtracting the wheel speeds VFL, VFR of the right and left front wheels 2FL, 2FR. Further, the slip amount calculation section 41 calculates a mean slip amount SAv based on the slip amounts SL, SR and gives the greater one of the slip amounts SL and SR a maximum slip amount SHi.

(Slip judgment)

The slip judgment section 42 determines that the slip control is necessary when the maximum slip value SHi exceeds the threshold value. In this case, the start threshold is employed under the slip control condition and the end threshold is employed in the non slip control condition.

(Determination of the engine control target slip amount)

The engine output is reduced to suppress the slip amount of the front wheels 2FL, 2FR so that it is less than the target slip amount. The engine control target slip amount is determined in light of a map prepared based on the vehicle body speed Vr and road friction coefficient μ.

The engine control target setting section 43 provides the engine control target value with a value greater than the supercharging pressure control target slip amount in the supercharging zone. When the engine operating condition is transferred from the supercharging condition to the non-supercharging condition, the engine control target value is reduced from the greater value to a smaller value (see FIG. 8).

(Calculation of the engine control value)

The engine control level calculation section 44 determines the engine control level or value FC based on the deviation EN of the mean slip amount SAv from the engine control target amount and the change rate DEN of the deviation. A feedback compensation value for the preceding value FC(K-1), used in the preceding cycle, and initial compensation value are added to the control level determined in the above procedure to get a final value of the engine control level within a range from 1 through 15.

(Judgment of the supercharging zone)

The supercharging zone judgment section 45 finds the supercharging zone when the boost pressure or intake gas pressure downstream of the supercharger detected by the pressure sensor 10 is greater than the atmospheric pressure. If the boost pressure is less than the atmospheric pressure, the section 45 finds the non-supercharging zone.

(Determination of the supercharging pressure control target slip amount)

The supercharging pressure control target slip amount is provided for controlling the opening of the supercharging pressure control valve to reduce the slip amount of the front wheels 2FL, 2FR to the target value. The target setting section 46 determines the target value in light of a map prepared based on the vehicle body speed Vr and the friction coefficient μ as well as the engine control target slip amount.

(Engine output control)

Engine output control section 45 controls the engine output by means of the ignition timing control and/or fuel injection control (fuel cut control), or the opening control of the supercharging pressure control valve 38.

(Ignition timing control)

Figure 5:
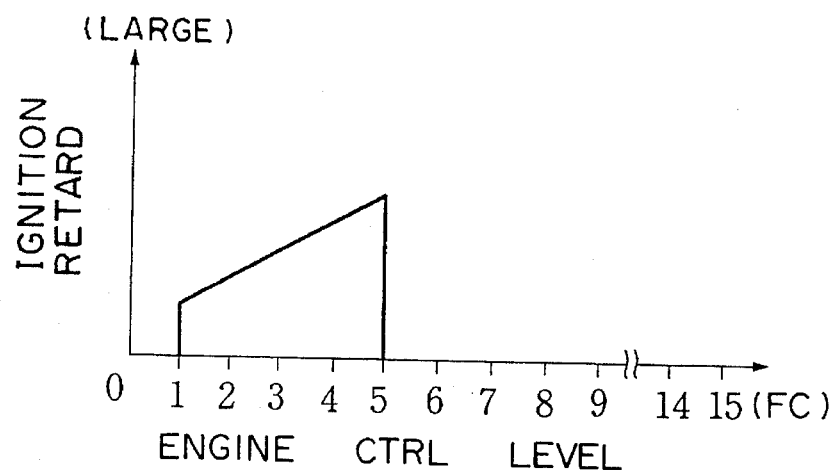
FIG. 5 is a graphical-representation showing a relationship between ignition retard amount and engine control level.
Figure 6:
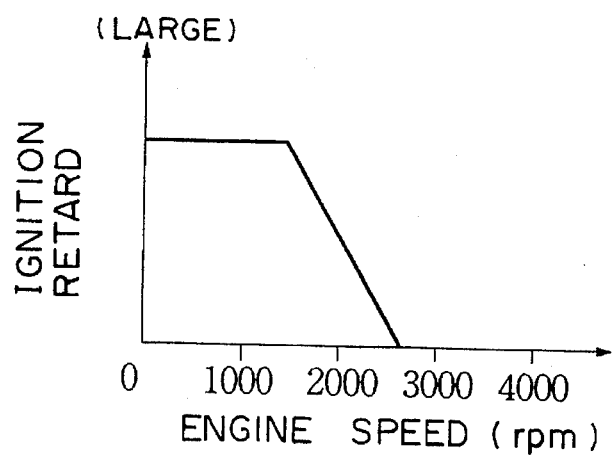
FIG. 6 is a graphical representation showing a relationship between ignition retard amount and engine speed.

The ignition timing is determined to be retarded based on the engine control level FC to control the engine output torque as shown in FIG. 5. This control is restricted in a high engine speed condition as shown in FIG. 6.

(Restriction of fuel injection (fuel cut))

Figure 7:
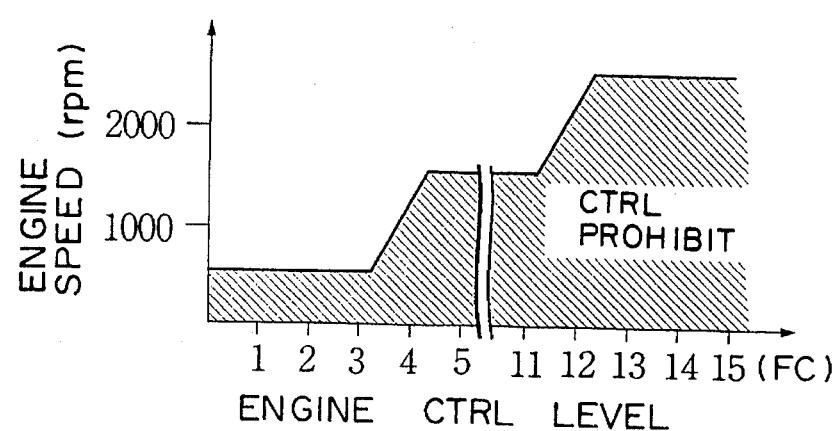
FIG. 7 is a graphical representation showing a relationship between the engine speed and the engine control level.

The restriction of the fuel injection is made by selecting a fuel injection control pattern from 0 to 12 in a map shown in Table 1 based on the control level. As the engine control level INO is increased, a control pattern of a greater number is selected to largely restrict the engine output torque. In this case, each of the engine control levels includes fuel cut control conditions so that the fuel cut is restricted where the engine speed is low as shown in FIG. 7. In Table 1, the sign X denotes the fuel cut.

torque is reduced by controlling the opening and closing speed of the supercharging pressure control valve 38. In this control, the opening and closing amount of the valve 38 is determined based on the mean slip amount SAv and the target value for the valve 38. For this purpose, the opening and closing amount of the valve 38 is determined in light of a map prepared by the deviation EN of the mean slip amount SAv from the control valve target slip amount and the change rate DEN of the deviation EN as shown in Table 2.

TABLE 2

|    |     | DEN |    |    |    |    |    |    |
|----|-----|-----|----|----|----|----|----|----|
|    |     | (−) |    |    | 0  |    | (+)|    |
| EN | (−) | NB  | NB | NB | NB | NM | ZO | ZO |
|    |     | NM  | NM | NM | NM | NS | ZO | ZO |
|    |     | NM  | NM | NM | NS | ZO | ZO | ZO |
|    | 0   | NS  | NS | NS | ZO | ZO | ZO | ZO |
|    |     | ZO  | ZO | ZO | ZO | PS | PS | PS |
|    |     | ZO  | ZO | PS | PM | PM | PM | PM |
|    | (+) | ZO  | ZO | PM | PB | PB | PB | PB |

TABLE 3

| CTRL AMOUNT | NB | NM | NS | ZO | PS | PM | PB  |
|---|---|---|---|---|---|---|---|
| SPEED | −8 | −5 | −2 | 0 | +2 | +5 | +10 |

In the map shown in table 2, a reference character Z0 indicates holding of the opening, a reference character N indicates a closing action of the valve 38 and a reference character P indicates an opening action of the valve 38. Subscripts S, M, B for the reference character N and P denote the amount of the opening and closing of the valve 38. The subscripts S, M and B denote small, middle and large opening or closing amounts of the valve 38, respectively.

Next, the opening and closing speeds (8/second) are set based on the opening and closing amounts of the valve 38 in accordance with a map shown in Table 3. Full opening of the supercharging pressure control valve 38 corresponds to 100%. As the opening and closing amount or control value of the valve 38 is increased, the opening speed is greater than

TABLE 1

| PATTERN | 1 | 2 | 3 | 4 | 5 | 6 | 7 | 8 | 9 | 10 | 11 | 12 | REMARKS |
|---|---|---|---|---|---|---|---|---|---|---|---|---|---|
| 0 | | | | | | | | | | | | | FULL CYLINDER INJECTION |
| 1 | x | | | | | | | | | | | | 1 CYLINDER INTERMIT |
| 2 | x | | | | | x | | | | | | | 1 CYLINDER CUT |
| 3 | x | | x | | x | | | | | | | | |
| 4 | x | | x | | | x | | x | | | | | 2 CYLINDER CUT |
| 5 | x | x | x | | | x | | x | | | | | |
| 6 | x | x | | x | | | x | x | | x | | | 3 CYLINDER (ONE BANK) CUT |
| 7 | x | x | | x | x | | x | x | | x | | | |
| 8 | x | x | | x | x | | x | x | | x | x | | 4 CYLINDER CUT |
| 9 | x | x | x | x | x | | x | x | | x | x | | |
| 10 | x | x | x | x | x | | x | x | x | x | x | | 5 CYLINDER CUT |
| 11 | x | x | x | x | x | x | x | x | x | x | x | | |
| 12 | x | x | x | x | x | x | x | x | x | x | x | x | FULL CYLINDER CUT |

(Opening and closing speed control of the supercharging pressure control)

In the supercharging condition where the boost pressure is greater than the atmospheric pressure, the engine output the closing speed. In other words, the opening speed of the value corresponding to the opening amount PB is greater than the closing speed corresponding to the closing amount NB. Where the opening and closing amounts are small, the opening speed is substantially equal to the closing speed.

Figure 8:
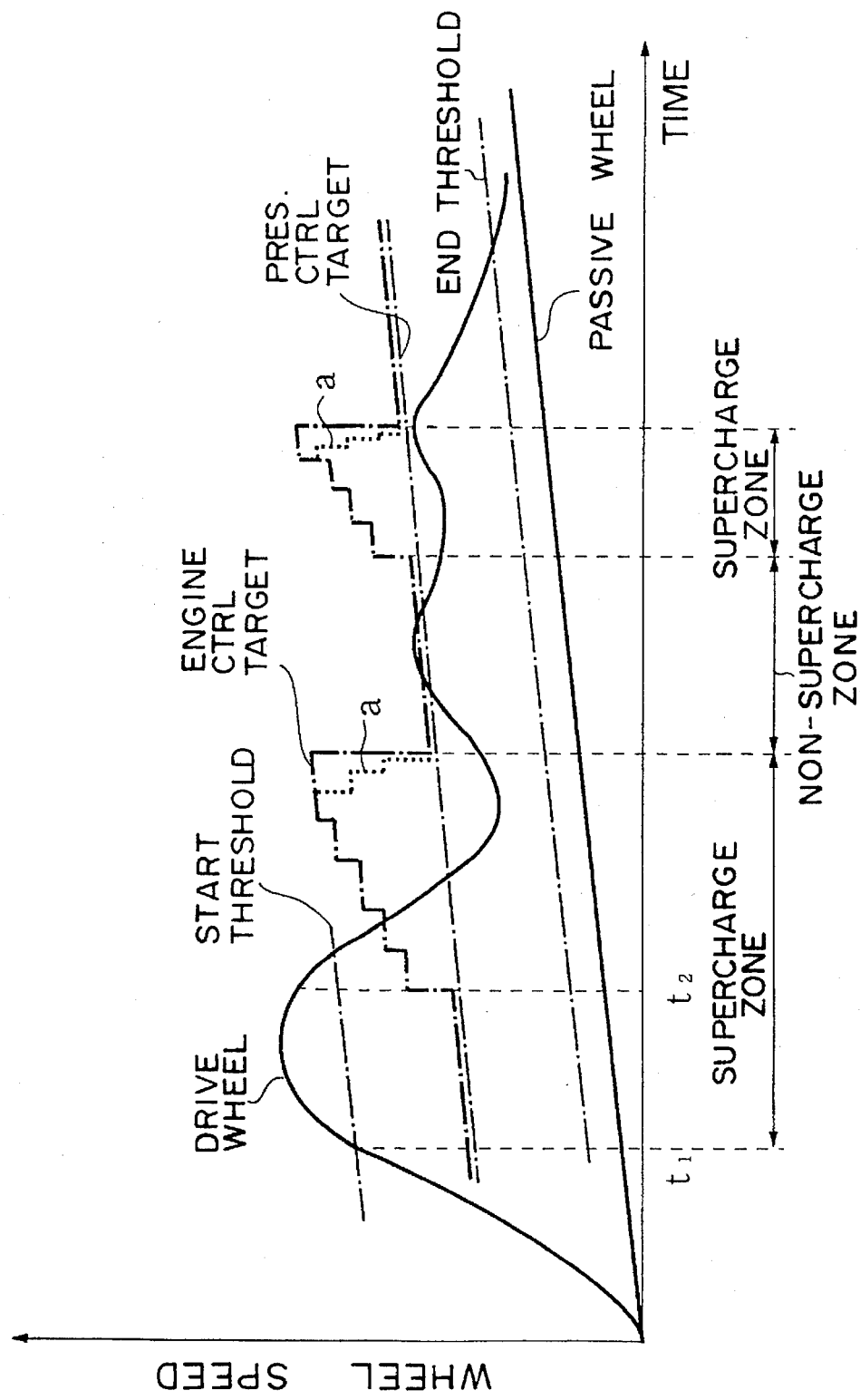
FIG. 8 is a graphical representation of a time chart showing a relationship of the threshold value slip target amounts.

FIG. 8 shows a time chart in which a relationship is shown between the wheel speed and the start and end threshold, engine control and supercharging pressure control target slip values. FIG. 9 shows a time chart for the slip control. In FIGS. 8 and 9, solid lines show that the initial spin or slip condition of a drive wheel takes place.

In the supercharging zone, after the initial slip amount of the drive wheel exceeds the start threshold value, the engine control or the supercharging pressure control is carried out. In FIG. 8, the engine control target and supercharging pressure control target slip amounts are set at substantially the same value for the time period from t1 to t2. The engine control, such as ignition timing and/or fuel injection restriction, and the supercharging pressure control, or opening and closing speed control of the valve 38, are carried out to reach the respective target slip values. In carrying out the supercharging pressure control, a feedforward control is made for a certain period after the initial slip is detected to necessitate the slip control as shown in FIG. 9. In the feedforward control, the control valve 38 is opened at the maximum opening speed when the initial slip is detected. Thereafter, the valve is opened at a predetermined speed smaller than the maximum value. The feedforward control is terminated when the slip amount of the drive wheel is reduced to a predetermined value. Thereafter, the supercharging pressure control is made by means of a feedback control utilizing the opening and closing amounts and speeds of the valve 38 shown in the maps of Tables 2 and 3. The feedforward control may be ended when the boost pressure is reduced below a predetermined value or when a predetermined time period passes.

In the time period t1-t2, the target slip amounts of the engine control and the supercharging pressure are provided at substantially the same value so that both controls are carried out at the same time. Thus, the initial slip condition, due to the initial spin of the drive wheel, can be reduced responsively. The feedforward control of the supercharging is effected to reduce the slip amount of the initial slip condition quickly.

After the initial slip is reduced in the supercharging condition, the engine control target slip amount is gradually increased to a predetermined value. In addition, the feedback control of the opening and closing amounts and speeds of the control valve 38 are initiated by referring to the maps shown in Tables 2 and 3. In the supercharging condition, only the supercharging pressure control is usually carried out. Thus, after the initial spin is reduced to a certain level in the supercharging condition, the slip amount of the drive wheel can be effectively reduced. In the supercharging zone, the engine control, such as ignition and fuel injection restriction, is not carried out. As a result, the following effect can be obtained.

In the supercharging condition, if the ignition timing is retarded, there is a tendency to afterburn a large amount of intake gas because the intake gas is supercharged. This causes an undesirable increase of the catalyst temperature. Alternatively, where a fuel cut is made, the green component of the fuel deposited on the catalyst surface is burned because of introduction of the air which is not consumed for combustion in the combustion chamber. This also causes the undesirable increase of the catalyst temperature.

According to the present invention, after the initial slip condition is eliminated, the engine control target value is set greater than the supercharging pressure control target value of the slip amount. Thus, the engine control, such as the ignition timing and fuel cut controls, is less likely to be initiated to prevent the undesirable increase of the catalyst temperature. In this case, the target slip amount is gradually increased up to a predetermined value. As a result, if another slip condition takes place after the initial slip condition settles down, then the engine control is initiated along with the supercharging pressure control so as to reduce the slip amount as soon as possible.

As soon as the engine operating condition gets out of the supercharging condition, the target slip amount for the engine control is quickly lowered. Alternatively, the change of the engine control target value may be gradual as shown by a broken line a in FIG. 8. This makes the transition of the slip control smooth as the engine operating condition is changed between the supercharging and non-supercharging conditions.

After the engine operating condition is transferred to the non-supercharging condition, only the engine control is carried out and the opening amount of the supercharging pressure control valve 38 is held. Thus, the slip amount of the drive wheel is reduced through the engine control. Where the slip amount of the drive wheel is reduced enough to make the engine control level FC zero, the slip control or traction control for reducing the engine output is terminated. Then, the engine output may be increased in response to the acceleration stroke so that the engine operating condition gets into the supercharging zone.

When the engine operating condition falls into the supercharging zone against the engine control target slip amount is gradually increased up to the predetermined value and the feedback control for the opening and closing amounts and speeds of the control valve 38 is carried out utilizing the maps of Tables 2 and 3. This control is repeated as the slip condition takes place.

Thereafter, where the maximum slip amount SHi of the drive wheel is reduced below the end threshold value before a predetermined time period such as 2 or 3 seconds passes, the slip control is finished.

Figure 10:
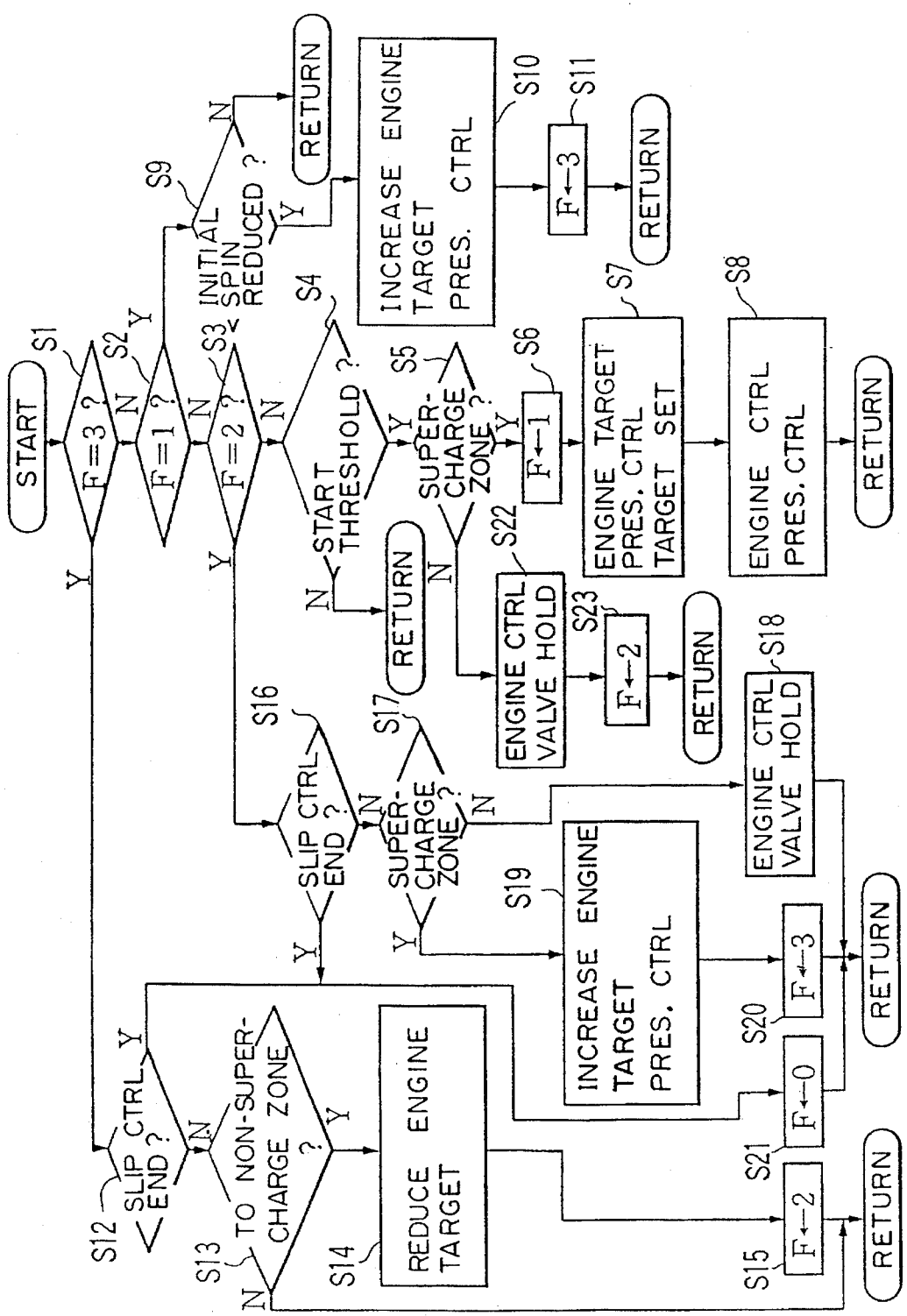
FIG. 10 is a flow chart of the slip control.

FIG. 10 shows a flowchart of a slip control.

In FIG. 10, flag value F=0 means the slip control is not carried out. The flag values F=1-3 means the slip control is under operation. In detail the flag F=1 means the initial spin takes place in the supercharging condition. The flag F=2 means the initial spin takes place in the non-supercharging condition. The flag F=3 means the initial spin took place and the slip amount is reduced below a certain level in either the supercharging or non-supercharging zone.

In step S1 through step S3, if the flag F is 0 or if the slip control device 20 finds that the slip control is not carried out, the control device 20 judges whether or not the slip amount exceeds the start threshold value for starting the slip control to reduce the drive wheel in step S4. In step S5, the control device 20 judges whether or not the engine operating condition is in the supercharging zone. If the engine operating condition is in the supercharging zone, then the control device 20 sets the flag at F=1.

In step S7, the control device 20 sets the engine control target slip amount through the target setting section 43 and sets the supercharging pressure control target slip amount through the setting section 46. In this case, when the initial spin condition takes place in the supercharging condition, the control device 20 sets substantially the same value for the engine control target slip amount and the supercharging pressure control target slip amount.

In step S8, both the engine control, such as ignition timing and/or the fuel injection restriction, and the supercharging pressure control are carried out. In carrying out the supercharging pressure control, the feedforward control is carried out a predetermined time period after the initial spin (see FIG. 9). In the feedforward control of the supercharging pressure control, the control valve 38 is opened at the maximum speed up to the predetermined opening and thereafter opened at the predetermined speed which is smaller than the maximum opening speed. The feedforward control is finished as the slip amount of the drive wheel is reduced below the predetermined value. Then, the feedback control is carried out in accordance with the opening and closing amounts and speeds obtained by making reference to the maps of Tables 2 and 3.

According to the illustrated embodiment, the target values for the engine control and the supercharging pressure control are set at substantially the same values so that both controls are carried out at the same time to improve the responsiveness of the slip control. Furthermore, the feedforward control is made at the initial stage after the initial slip condition takes place in step S8 to reduce the slip amount quickly and reliably.

In step S2, where the flag F is 1 or the initial spin is detected in the supercharging condition, the control device 20 judges whether or not the initial spin is reduced properly. If the judgment is yes or the initial spin is well reduced, then the procedure goes to step S10. In step S10, the target slip amount for the engine control is gradually increased up to the predetermined value as shown in FIG. 9. Then, the feedback control is carried out based on the opening and closing amounts and speeds of the valve 38 obtained through the maps of Tables 2 and 3. Then, the flag is set at F=3.

According to the illustrated embodiment, in the supercharging condition after the initial spin is largely reduced, the engine control target slip amount is gradually increased. As a result, only the supercharging pressure control is usually carried out under this condition. Thus, the slip amount of the drive wheel can be effectively reduced in the supercharging condition after the initial spin is reduced to a certain level by means of the supercharging pressure control. In this condition, the engine control, such as the ignition timing and fuel cut controls, is not carried out so that the undesirable increase of the catalyst temperature can be effectively suppressed.

Further, in step S10, the engine control target slip amount is gradually increased after the initial spin is reduced to a certain level. Thus, even if another slip condition takes place just after the initial slip condition has been settled down to the certain level, the slip amount of the drive wheel can be effectively reduced.

In step S1, where the flag F is 3 or the initial slip condition has already settled down, the control device 20 judges whether or not the slip control is to be finished. This judgment is made when the maximum slip amount SHi is reduced below the end threshold value and a certain time period, such as 1 through 3 seconds, passes.

If the slip control is not finished, the procedure goes to step S13 and the control device 20 judges whether or not the engine operating condition is about to fall into the non-supercharging zone. If this judgment is yes, then the control device 20 drops the engine control target slip amount quickly in step S14. This amount was gradually increased in step S10. However, the reduction of the engine control target value may be made gradually as shown by the broken line a in FIG. 8. Thus, a smooth transition of the slip control can be made between the supercharging and non-supercharging zones. Then, the control device 20 sets the flag F at 2.

In step S3, where the flag F is 2 or the engine operating condition is in the non-supercharging zone, the control device 20 judges whether or not the traction control is finished. If not, then step S17 is carried out. In step S17, the judgment is made as to whether the engine operating condition is in the supercharging zone. If the engine operating condition is in the non-supercharging zone, then the procedure goes to step S18, in which the control device makes the engine control and holds the opening of the supercharging control valve 38 so as to reduce the slip amount of the drive wheel.

In step S17, if the supercharging zone is found, then the procedure goes to step S19, in which the engine control target slip amount is gradually increased as shown in FIG. 9 as well as step S10 and the feedback control is initiated. Then the flag F is set at 3 in step S20.

In steps S12 and S16, if it is judged that the slip control is finished, the procedure goes to step S21, in which the flag F is set at 0.

In step S5, if it is judged that the engine operating condition is in the non-supercharging zone or, in other words, if the initial spin took place in the supercharging zone, then the procedure goes to step S22, in which only the engine control is made and the opening of the supercharging pressure control valve is held at its current position. Thus, in this condition, the slip amount is reduced through the engine control.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. In combination, a vehicle and a slip control system for the vehicle comprising:

an engine for producing an engine output;

an engine control device for controlling said engine output;

a drive wheel driven by said engine output:

a transmission for transmitting said engine output from said engine to said drive wheel;

a supercharger driven by said engine so as to produce supercharging pressure provided to said engine;

a supercharging pressure control device for controlling said supercharging pressure produced by said supercharger;

rotation speed detecting means for detecting a rotation speed of said drive wheel;

slip detecting means for detecting a slip amount of the drive wheel based on the rotation speed of the drive wheel;

supercharging condition detecting means for detecting an intake pressure supplied to said engine, a supercharging condition when said intake pressure is greater than a predetermined pressure and a non-supercharging condition when said intake pressure is not greater than said predetermined pressure: and engine output restriction means for restricting the engine output by utilizing at least one of the supercharging pressure control device and the engine control device to reduce the slip amount of the drive wheel when the slip amount of the drive wheel exceeds a predetermined threshold value;

the engine output restriction means controlling the supercharging pressure by the supercharging pressure control device in the supercharging condition when the slip amount of the drive wheel exceeds the predetermined threshold value, the engine output restriction means controlling the engine output by means of the engine control device in the non-supercharging condition when the slip amount of the drive wheel exceeds the predetermined threshold value.

2. A combination system as recited in claim 1 wherein the supercharging pressure control device is a supercharging pressure control valve which controls an amount of supercharged gas produced by the supercharger.

3. A combination as recited in claim 2 wherein the engine output restriction means controls opening and closing amounts and speeds of the supercharging pressure control valve in the supercharging condition.

4. A combination as recited in claim 1 wherein the engine control device controls an ignition timing of an engine.

5. A combination as recited in claim 1 wherein the engine control device controls a fuel supply to said engine so that a fuel supply for a specific cylinder of the engine is cut to restrict the engine output.

6. A combination as recited in claim 1 wherein the engine output restriction means comprises:

supercharging pressure control target setting means for setting a supercharging pressure control target slip amount to which the engine output is controlled by the supercharging pressure control device in the supercharging condition; and engine control target setting means for setting an engine control target slip amount to which the engine output is controlled by the engine control device;

the engine control target slip amount being greater than the supercharging pressure control target slip amount in the supercharging condition and reduced to a predetermined value as an engine operating condition changes from the supercharging condition to the non-supercharging condition.

7. A combination as recited in claim 6 wherein the engine control target setting means reduces gradually the engine control target slip amount to the predetermined value as the engine operating condition changes from the supercharging condition to the non-supercharging condition.

8. A combination as recited in claim 6 wherein the engine control target setting means reduces abruptly the engine control target slip amount to the predetermined value as the engine operating condition changes from the supercharging condition to the non-supercharging condition.

9. A combination as recited in claim 1 wherein the engine output restriction means controls both the supercharging pressure control device and the engine control device to reduce the slip amount of the drive wheel at an initial stage of a slip control when slip of the drive wheel takes place.

10. A combination as recited in claim 1 wherein the engine output restriction means comprises:

supercharging pressure control target setting means for setting a supercharging pressure control target slip amount to which the engine output is controlled by the supercharging pressure control device in the supercharging condition; and engine control target setting means for setting a engine control target slip amount to which the engine output is controlled by the engine control device;

the engine control target slip amount being set at substantially the same value as the supercharging pressure control target slip amount at an initial stage of a slip control and in the supercharging condition, gradually increasing up to a predetermined value.

11. A combination as recited in claim 2 wherein the engine output restriction means controls the supercharging pressure control valve to open at a maximum opening speed by a feedforward control.

12. A combination as recited in claim 11 wherein the engine output restriction means finishes the feedforward control when the slip amount of the drive wheel is reduced below a predetermined threshold value.

13. A combination as recited in claim 11 wherein the engine output restriction means finishes the feedforward control when the intake pressure downstream of the supercharger is reduced below a predetermined threshold value.

14. A combination as recited in claim 11 wherein the engine output restriction means finishes the feedforward control when a predetermined time period passes after a slip of the drive wheel is detected.

* * * * *